United States Patent
Roscher et al.

(10) Patent No.: US 10,302,490 B2
(45) Date of Patent: May 28, 2019

(54) METHOD AND APPARATUS FOR ACTUATING AN ACOUSTO-OPTICAL COMPONENT

(71) Applicant: Carl Zeiss Microscopy GmbH, Jena (DE)

(72) Inventors: Burkhard Roscher, Jena (DE); Stefan Wilhelm, Jena (DE); Gunter Moehler, Mochau (DE)

(73) Assignee: Carl Zeiss Microscopy GmbH, Jena (DE)

( * ) Notice: Subject to any disclaimer, the term of this patent is extended or adjusted under 35 U.S.C. 154(b) by 202 days.

(21) Appl. No.: 15/320,567

(22) PCT Filed: Jun. 19, 2015

(86) PCT No.: PCT/EP2015/001240
§ 371 (c)(1),
(2) Date: Dec. 20, 2016

(87) PCT Pub. No.: WO2015/192967
PCT Pub. Date: Dec. 23, 2015

(65) Prior Publication Data
US 2018/0231416 A1    Aug. 16, 2018

(30) Foreign Application Priority Data
Jun. 20, 2014 (DE) .................. 10 2014 009 142

(51) Int. Cl.
*G01J 3/06* (2006.01)
*G01J 3/12* (2006.01)
(Continued)

(52) U.S. Cl.
CPC .............. *G01J 3/1256* (2013.01); *G01J 3/06* (2013.01); *G01J 3/12* (2013.01); *G02B 21/002* (2013.01);
(Continued)

(58) Field of Classification Search
CPC ........ G01J 3/06; G01J 3/10; G01J 3/12; G01J 3/1256; G01J 3/18; G01J 3/28;
(Continued)

(56) References Cited

U.S. PATENT DOCUMENTS 3,729,251 A    4/1973  Hearn
6,848,825 B1   2/2005  Simon et al.
(Continued)

FOREIGN PATENT DOCUMENTS

CN    1910505 A    2/2007
CN    201681208 U  12/2010
(Continued)

OTHER PUBLICATIONS

Tian, et al.; "Interchannel Interference in Multiwavelength Operation of Integrated Acousto-Optical Filter and Switches"; Journal of Lightwave Technology 1995; 13(6):1146-1154.
(Continued)

*Primary Examiner* — Loha Ben
(74) *Attorney, Agent, or Firm* — Duane Morris LLP

(57) ABSTRACT

A method and apparatus for actuating an acousto-optical component for manipulating light passing therethrough, in particular for manipulating the illumination and/or detection light in the beam path of a microscope, preferably a laser scanning microscope, where the illumination and/or detection wavelength is adjusted by means of at least one frequency generator connected to the acousto-optical component and controlling the manipulation, the frequency generator generates a signal which generates a spectral spread for the intensity distribution of the wavelength of the illumination and/or detection light for ensuring a temperature-independent manipulation. Actuation is effected by two or more actuation signals in such a way that two or more overlapping and/or superposing main lobes of the transfer
(Continued)

function of the acousto-optical component or main maxima are generated.

11 Claims, 5 Drawing Sheets

(51) Int. Cl.
| | |
|---|---|
| *G01J 3/18* | (2006.01) |
| *G01J 3/28* | (2006.01) |
| *G02F 1/11* | (2006.01) |
| *G02F 1/33* | (2006.01) |
| *H01S 3/00* | (2006.01) |
| *G02B 21/00* | (2006.01) |
| *G02B 21/16* | (2006.01) |

(52) U.S. Cl.
CPC .............. *G02B 21/16* (2013.01); *G02F 1/113* (2013.01); *G02F 1/116* (2013.01); *G02F 1/33* (2013.01); *G01J 3/18* (2013.01); *G01J 3/2823* (2013.01); *G01J 2003/1204* (2013.01); *G01J 2003/1213* (2013.01); *G02F 2203/21* (2013.01); *H01S 3/0078* (2013.01)

(58) Field of Classification Search
CPC .......... G01J 3/2803; G01J 3/2823; G01J 3/40; G01J 3/447; G01J 3/453; G01J 2003/102; G01J 2003/1204; G01J 2003/1213; G01J 2003/1226; G01J 2003/1239; G01J 2003/1247; G01J 2003/2826; G01J 2003/284; G01J 2003/2843; G02F 1/11; G02F 1/113; G02F 1/116; G02F 1/0032; G02F 1/33; G02F 1/3511; G02F 1/353; G02F 2203/21; G02F 27/42; G02F 27/46; G02B 21/002; G02B 21/004; G02B 21/0064; G02B 21/06; G02B 21/16; H01S 3/00; H01S 3/0057; H01S 3/0078; A61B 5/0095
USPC ....... 359/237, 238, 240, 264, 285, 287, 305, 359/308, 385, 389, 558, 563, 566; 356/300, 305, 328; 367/21, 43, 49, 64; 324/76.19, 76.21, 76.23
See application file for complete search history.

(56) References Cited

U.S. PATENT DOCUMENTS

| | | | | |
|---|---|---|---|---|
| 6,958,858 B2* | 10/2005 | Engelhardt | .......... | G02B 21/002 |
| | | | | 250/339.02 |
| 8,718,414 B2* | 5/2014 | Gugel | ................ | G02B 21/0064 |
| | | | | 385/7 |
| 9,001,320 B2* | 4/2015 | Harel | ........................ | G01J 3/10 |
| | | | | 356/300 |
| 9,400,404 B2* | 7/2016 | Gugel | ................ | G02B 21/0064 |
| 9,833,187 B2* | 12/2017 | Eyal | ..................... | A61B 5/0095 |
| 10,132,682 B2* | 11/2018 | Seyfried | ............... | G01J 3/1256 |
| 2010/0053725 A1 | 3/2010 | Seyfried | | |

FOREIGN PATENT DOCUMENTS

| | | |
|---|---|---|
| DE | 198 27 140 A1 | 12/1999 |
| DE | 198 58 456 A1 | 7/2000 |
| DE | 10 029 167 A1 | 1/2002 |
| DE | 197 02 753 C2 | 4/2003 |
| DE | 10 2006 034 905 A1 | 1/2008 |
| DE | 20 2007 015 506 U | 3/2008 |
| DE | 10 2006 053 187 A1 | 5/2008 |
| EP | 1 795 938 A2 | 11/2006 |
| JP | 2000-047117 A | 2/2000 |
| JP | 2003-177329 A | 6/2003 |
| JP | 2005-274155 A | 10/2005 |
| JP | 2011-504244 A | 2/2011 |
| WO | WO 2009/060027 A1 | 5/2009 |

OTHER PUBLICATIONS

Kirkby, Paul A., et al.; "A compact acousto-optic lens for 2D and 3D femtosecond based 2-photon microscopy"; Optics Express 2010; 18(13):13721-13745.
Tian, F., et al.; "Interchannel Interference in Multiwavelength Operation of Integrated Acousto-Optical Filters and Switches"; Journal of Lightwave Tech 1995; 13(6):1146-1154.
English translation of Japanese Office Action dated Jun. 5, 2018.
English translation of Chinese Office Action dated Sep. 5, 2017.

\* cited by examiner

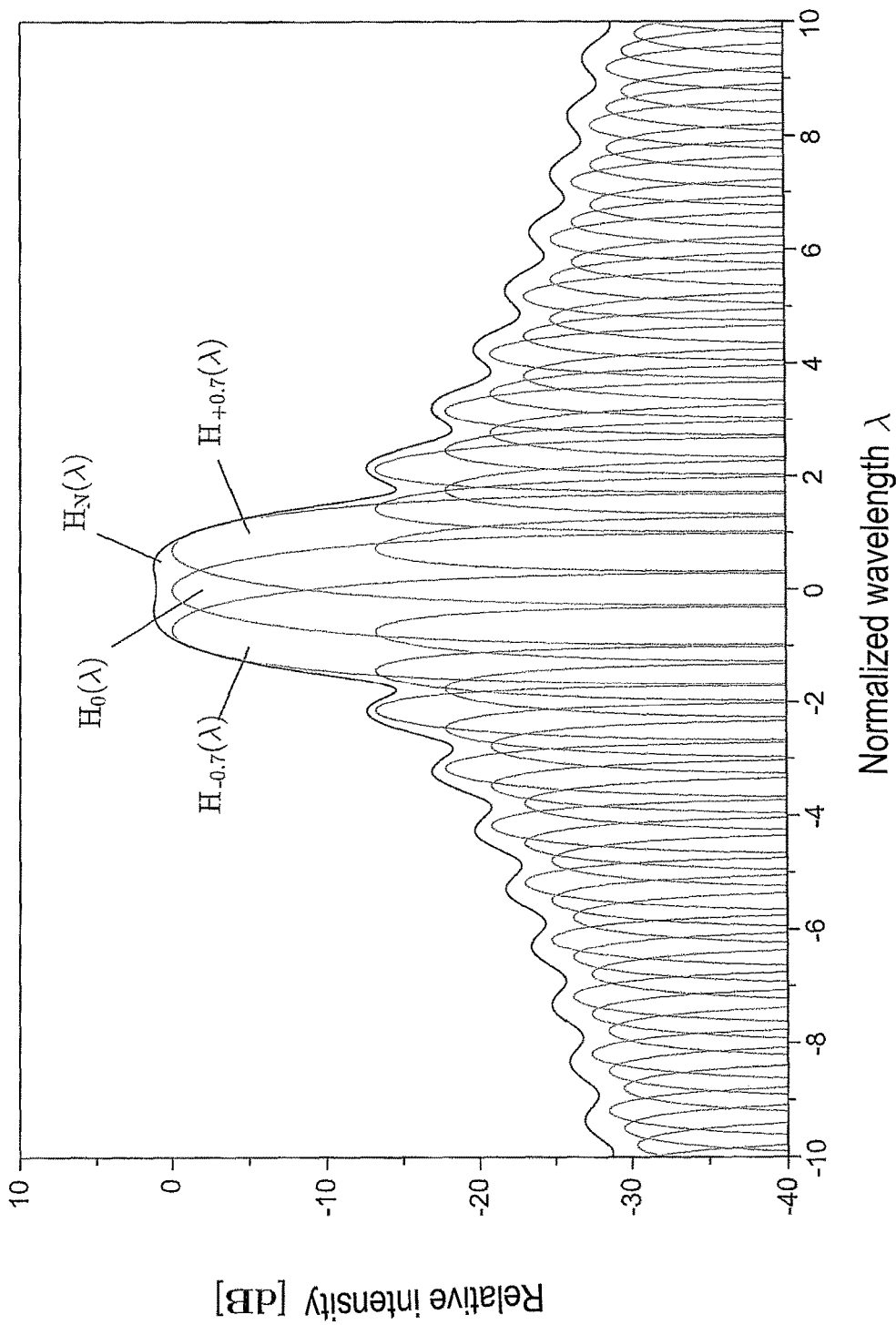

METHOD AND APPARATUS FOR ACTUATING AN ACOUSTO-OPTICAL COMPONENT

RELATED APPLICATIONS

The present application is a U.S. National Stage application of International PCT Application No. PCT/EP2015/001240 filed on Jun. 19, 2015 which claims priority benefit of German Application No. DE 10 2014 009 142.2 filed on Jun. 20, 2014, the contents of each are incorporated by reference in their entirety.

FIELD OF THE INVENTION

The present invention relates generally to the field of laser systems, and more particularly, to a method and apparatus for actuating an acousto-optical component of a laser system in a laser scanning microscope.

BACKGROUND OF THE INVENTION

For selecting the wavelength and manipulating the intensity of the laser light, a laser system in a laser scanning microscope, as described in, inter alia, EP 1 795 938 A2 and DE 19702753C2, has an acousto-optical element (AOTF/AOM), the spectral properties of which are matched to the spectral characteristic of the laser light to be transmitted. FIG. 1 shows, in an exemplary manner, an ideal transfer function $H(\lambda)$ of an AOTF with a rectangular transducer when excited by a single sinusoidal wave.

The optical transfer properties of the acousto-optical element (AOTF/AOM) are usually set by the cut of the crystal and the geometry of the transducer applied thereon. By selecting the geometry, it is possible here to manipulate both the width of the main lobe and the decay behavior of the side lobes of the transfer function $H_0(\lambda)$. Often, a rectangular transducer is realized, the normalized transfer function $H_0(\lambda)$ of which describes the sinc$^2$ function.

$$H_0(\lambda) = \operatorname{sinc}^2\left(\frac{\lambda}{\lambda_0}\right)$$

For a given laser wavelength $\lambda_n$, the frequency $f_n$ of the exciting RF signal is determined, inter alia, by the material properties and the geometry of the crystal. It is inversely proportional to the laser wavelength $\lambda_n$, which may be manipulated by the excited diffraction grating.

$$\lambda_n \sim \frac{1}{f_n}$$

The transfer function $H_0(\lambda)$ is, inter alia, characterized by the following parameters (see also FIG. 6):

$B_{3dB}$—bandwidth at which the main lobe of the transfer function has decayed to half of the maximum thereof (also FWHM—full width at half maximum)

$B_N$—spacing of the zeros which delimit the main lobe of the transfer function

For the purposes of simultaneously manipulating two or more laser lines ($\lambda_1, \lambda_2, \ldots \lambda_n$), the RF signal used to actuate the acousto-optical element contains a sinusoidal carrier per laser line. Each sinusoidal carrier with the frequency $f_1, f_2, \ldots f_n$ excites a diffraction grating for the corresponding laser line in the acousto-optical element.

On account of the relationship $\lambda_n \sim 1/f_n$, the properties of the transfer function may also be characterized depending on the frequency of the exciting RF signal. In particular, it is possible to specify $\Delta f_{B_N}$ for the purposes of describing the width of the main lobe in a manner dependent on the detuning of the center frequency of the actuation signal. The following applies:

$\Delta f_{B_N} \sim 1/B_N$

For a rectangular transducer, $B_{3dB}$=0.89 and $B_N$=2 apply. Accordingly, the variables $B_N$ and $B_{3dB}$ behave as follows in relation to one another:

$B_{3dB}$=0.445 $B_N$ and FWHM=0.445 $B_N$.

Conventional Use of the AOTF

The distance $\Delta\lambda$ between two adjacent laser lines is selected to be at least so large that the main lobes of the transfer function $H_0(\lambda)$ of the acousto-optical element are not superposed. This is the case if the distance $\Delta\lambda$ between two laser lines is not less than the zero spacing $B_N$ of the main lobe of the transfer function $H_0(\lambda)$ of the acousto-optical element. The following applies:

$\Delta\lambda \geq B_N$

Therefore, the following emerges for the rectangular transducer:

$\Delta\lambda \geq 2.247$FWHM

The adaptation of the transducer geometry for adjusting the transfer properties is usually accompanied by a significant increase in the required power of the radiofrequency actuation signal of the AOTF in order to achieve the required diffraction efficiency of >90%. Compared to a standard AOTF with a rectangular transducer, the RF actuation power may have to be raised by up to 7 dB depending on the wavelength of the laser light. Typical values lie at >+27 dBm (~500mW) for the modified AOTF in comparison with +20 dBm (~100mW) for a standard AOTF.

Increasing the RF control power causes additional heating of the acousto-optical element and, as a result, causes a change in the optical properties of the crystal (e.g. TeO2) on account of the dependence of the speed of sound on the temperature therein.

There is, in particular, a significant spectral shift in the transfer function $H_0(\lambda)$ as a result of the heating.

It is possible to counteract this unwanted temperature drift by heating the AOTF crystal to a temperature significantly above room temperature (e.g. 50° C.) using a controlled electrical heater (DE-19827140-A1).

Alternatively, it is possible to undertake stabilization of the temperature using a Peltier element or realize temperature-controlled frequency tracking of the RF actuation signal as described in, for example, DE202007015506 U1 and DE19827140 A1.

Local changes in the crystal temperature as a result of brief variations in the RF actuation power—for example due to an intensity modulation of the laser light while recording the image—cannot be captured and compensated by such methods and have as a consequence unwanted changes in angle and intensity of the laser light in relation to the first order of diffraction of the AOTF as a result of the spectral shift of the transfer function $H_0(\lambda)$.

SUMMARY OF THE INVENTION

Given an arrangement and a method in accordance with the preambles of the independent claims, the invention is characterized by the respective characterizing features.

Preferred developments are the subject matter of the dependent claims.

The invention and the effects and advantages thereof are explained in more detail below.

BRIEF DESCRIPTION OF THE DRAWINGS

In the annexed drawings:

FIGS. 4 and 5 illustrate the relationships shown in FIG. 1 for the summed transfer function when actuating a AOTF with an OFDM signal.

DESCRIPTION OF THE INVENTION

According to the invention, the acousto-optical element is actuated by two or more sinusoidal RF signals per laser line. The spectral spacing $\Delta f$ of the sinusoidal RF signals is deliberately selected in such a way that there is a superposition of the main lobes of the excited transfer functions $H_0(\lambda)$. The overlap of the main lobes of the excited transfer functions $H_N(\lambda)$ is desired since this leads to a widening of the main lobe in the resultant transfer function $H_{93}(\lambda)$ as a result of the superposition of the individual transfer functions.

EXAMPLE

AO Tunable Filter AOTF. nc-VIS by AA Opto-Electronic (datasheet values):

| | |
|---|---|
| Optical wavelength $\lambda$ | 450-700 nm |
| Spectral resolution (FWHM) | 1.5 nm |
| Drive frequency f | 153-80 MHz |
| Tuning gradient $k_{Tune}$ | 0.292 MHz/nm |

Using the aforementioned relationships assuming a rectangular transducer, it is possible to calculate the following values from this:

| | | |
|---|---|---|
| Spacing of the zeroes $B_N$ | 3.37 nm | ($B_N$ = FWHM/0.445) |
| Spacing of the zeroes $\Delta f_{BN}$ | 0.98 MHz | ($\Delta f_{BN}$ = $k_{Tune} \cdot B_N$) |

In the case of conventional use, this means:

| | | |
|---|---|---|
| minimum spacing of the laser lines $\Delta\lambda$ | $\geq$3.37 nm | ($\Delta\lambda \geq$ 2.247 $\cdot$ FWHM) |
| spacing of the sinusoidal carriers $\Delta f$ | $\geq$0.98 MHz | |

In the case of inventive use:

| | |
|---|---|
| spacing of the sinusoidal carriers $\Delta f$ | <0.98 MHz |

This datasheet specifies a value of 30 kHz/° C. for the temperature-dependent drift of the AOTF frequency.

Skillful selection of the initial phase angle and amplitude of the individual carriers of the generated signal renders it possible for the signal I to have a (virtually) constant envelope.

Below, the invention is explained in more detail on the basis of the schematic drawings in 2-5.

Figure 1:
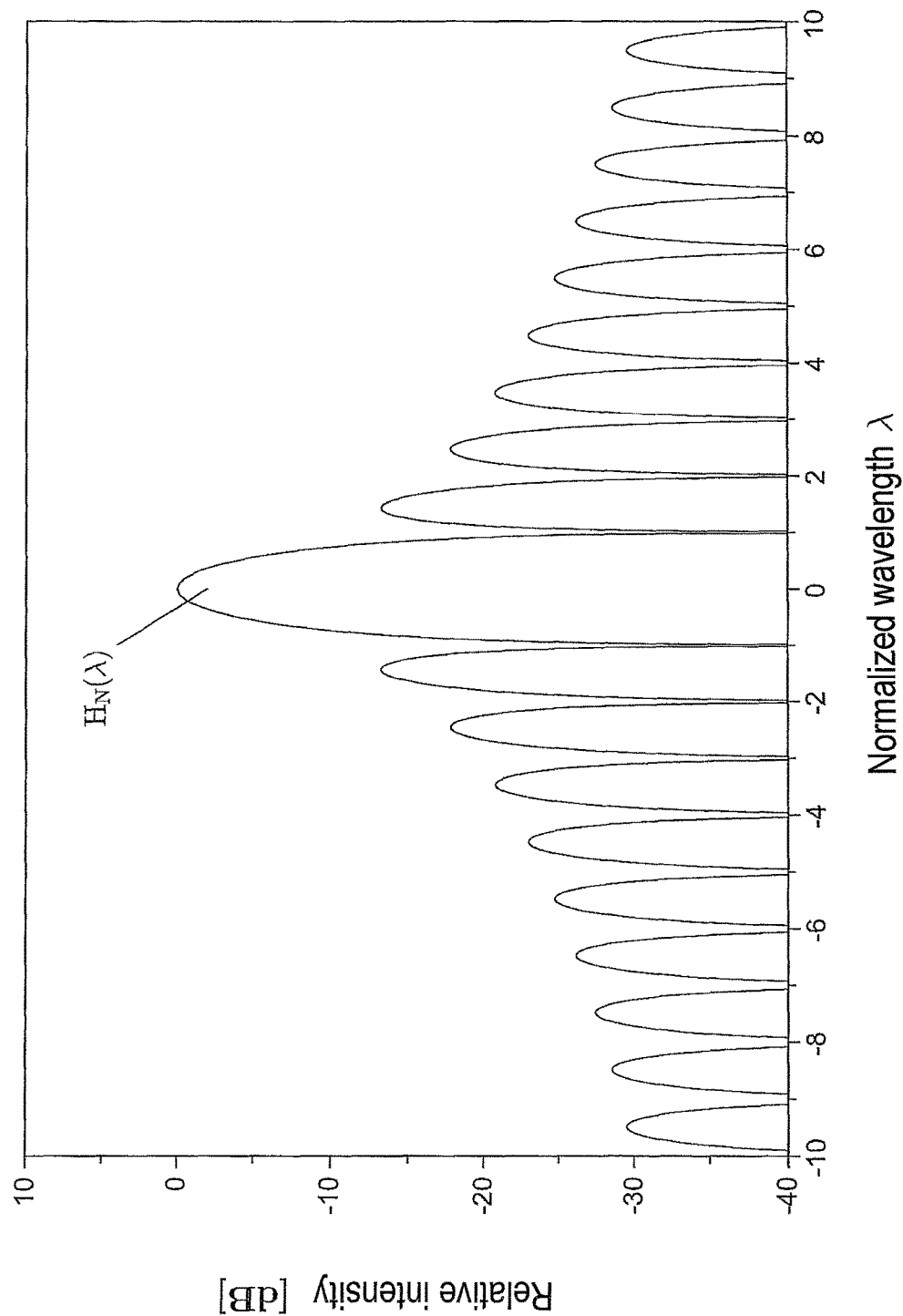
FIG. 1 illustrates the relationship of relative intensity to normalized wavelength.
Figure 2:
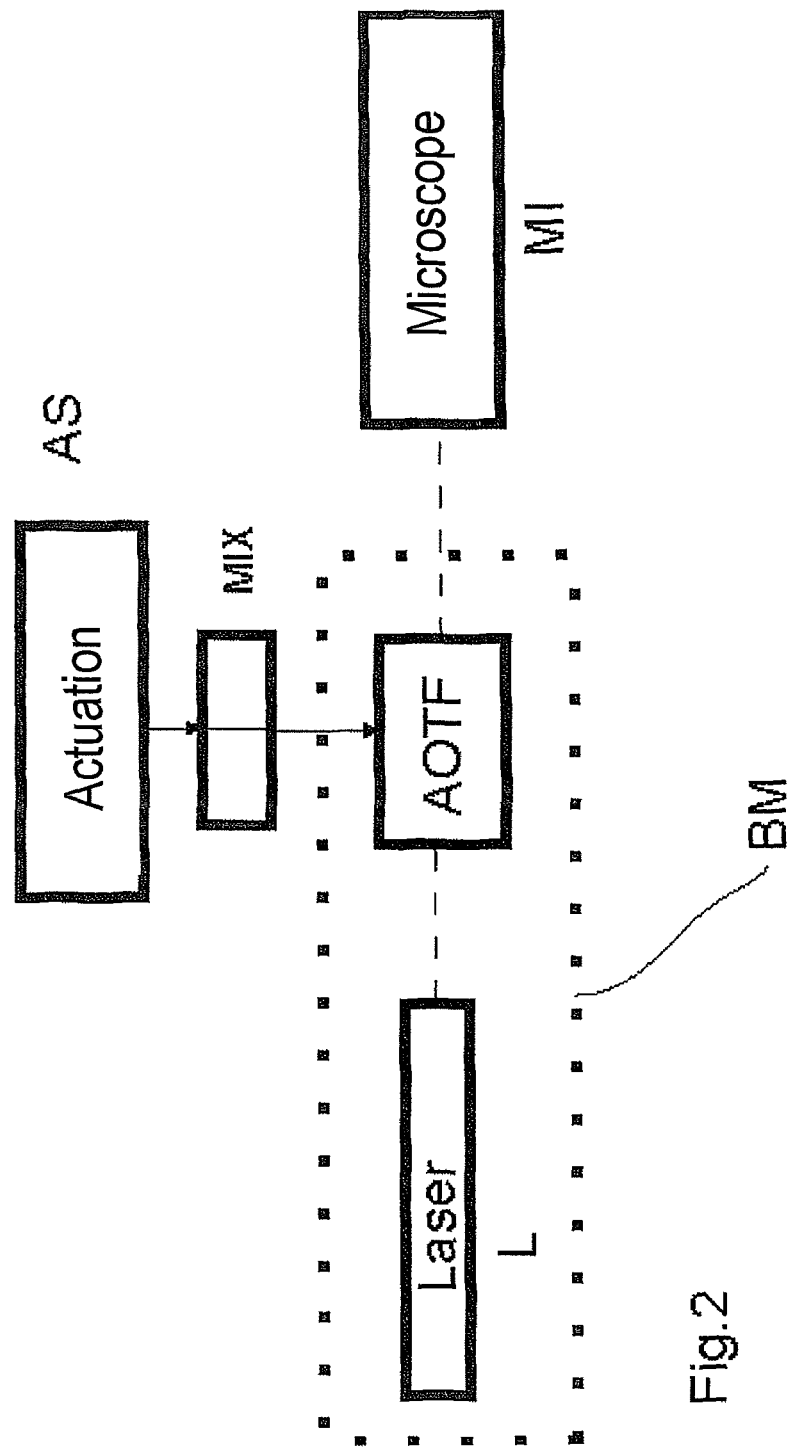
FIG. 2 is a schematic representation of a light source.

FIG. 2 schematically depicts a light source, for example by way of a laser L.

The light source may also consist of a plurality of lasers combined by beam splitters, as depicted in the prior art. Via an AOTF for selecting the wavelength and controlling the intensity, the light from the light source L travels in the direction of a microscope, preferably a laser scanning microscope.

Light source L and AOTF may also be arranged in an illumination module BM (depicted using dashed lines) which is optically connected to the microscopic beam path by direct coupling or by one or more optical fibers.

An actuation unit AS, usually linked with further microscope functions, also serves to actuate the AOTF.

According to the invention, a multifrequency mixer unit MIX is advantageously provided as a frequency generator between the actuation unit and the AOTF, the mode of operation of said multifrequency mixer unit still being explained in more detail below:

The invention relates to the actuation of an acousto-optical element (AOTF/AOM) with a radiofrequency signal. Such a signal contains a plurality of radiofrequency carriers which—although this is not mandatory—have a uniform distance $\Delta f$ from one another and have the same or different signal amplitudes.

This type of actuation causes a plurality of transfer functions $H_0(\lambda)$, which are predetermined by the crystal or transducer geometry, to be superposed, said transfer functions being shifted in relation to one another by a multiple of $\Delta f$ and being evaluated by the amplitude of the respectively exciting individual carrier.

The resultant transfer function $H_N(\lambda)$ emerges from the superposition of the spectrally shifted transfer function $H_0(\lambda)$ of the individual carriers exciting the acousto-optical element.

In respect of the decay behavior of the side lobes of the transfer function, it is expedient to select the carrier spacing $\Delta f$ of the actuating signal in such a way that the main lobes of adjacent transfer functions complement the minima of the respective direct neighbors.

As a result of this actuation and the superposition of a plurality of transfer functions $H_0(\lambda)$ resulting therefrom, the transfer function $H_N(\lambda)$ of the acousto-optical element experiences a spectral spread which, in particular, has a widening of the main lobe thereof as a consequence. By contrast, there is no change, or no significant change, in the decay behavior of the side lobes which, in the case of rectangular transducers, is predetermined by the sinc$^2$ function.

Accordingly, the excitation according to the invention of an acousto-optical element (AOTF/AON) allows arbitrary enlargement of the spectral width of the main lobe of the transfer function without substantially changing the decay behavior of the side lobes. This facilitates spreading the main lobe of the transfer function in such a way that, firstly, the pulse of a laser system is transferred in an ideal manner, as described in, inter alia, EP 1 795 938 A2, and, secondly, the response to temperature changes of the crystal no longer has any influence on the transfer of laser light at a specific wavelength. This succeeds by virtue of the width of the main lobe being spread by the number of carriers of the radiofrequency signal and the distances therebetween to such an extent that the pulse to be transferred still lies within the main lobe of the transfer function with the spectral width thereof, or that this also applies to the wavelength to be transferred of a gas or DPSS laser system, even in the case of a maximum temperature drift of the crystal. Here, the temperature range should comprise ambient temperatures in the range between 15° C. and 35° C., wherein the operating temperature of the crystal may lie approximately 20° C. higher than the ambient temperature.

As a result of the solution according to the invention for actuating acousto-optical elements (AOTF/AOM), it is possible to match the spectral properties of the crystal to the spectral properties of the coupled-in laser light without adapting the transducer geometry, i.e. using standard components. An additional positive effect consists of it being possible to completely dispense with heating the crystals. This reduces the disadvantageous influx of heat into the system. Designing more compact assemblages permitting a higher degree of system integration is rendered possible by dispensing with the heating and the electronic and mechanical components required to this end. Moreover, disadvantageous effects as a result of local heating of the crystals no longer occur either since the drift of the transfer function caused thereby is likewise caught by widening the main lobe thereof.

Moreover, the virtually rectangular characteristic of the main lobe of the transfer function $H_N(\lambda)$ is advantageous; it ensures that angle and intensity of the laser light in the first order of diffraction of the AOTF remain stable over the entire specified temperature range of e.g. 15° C. to 45° C.

Figure 3:
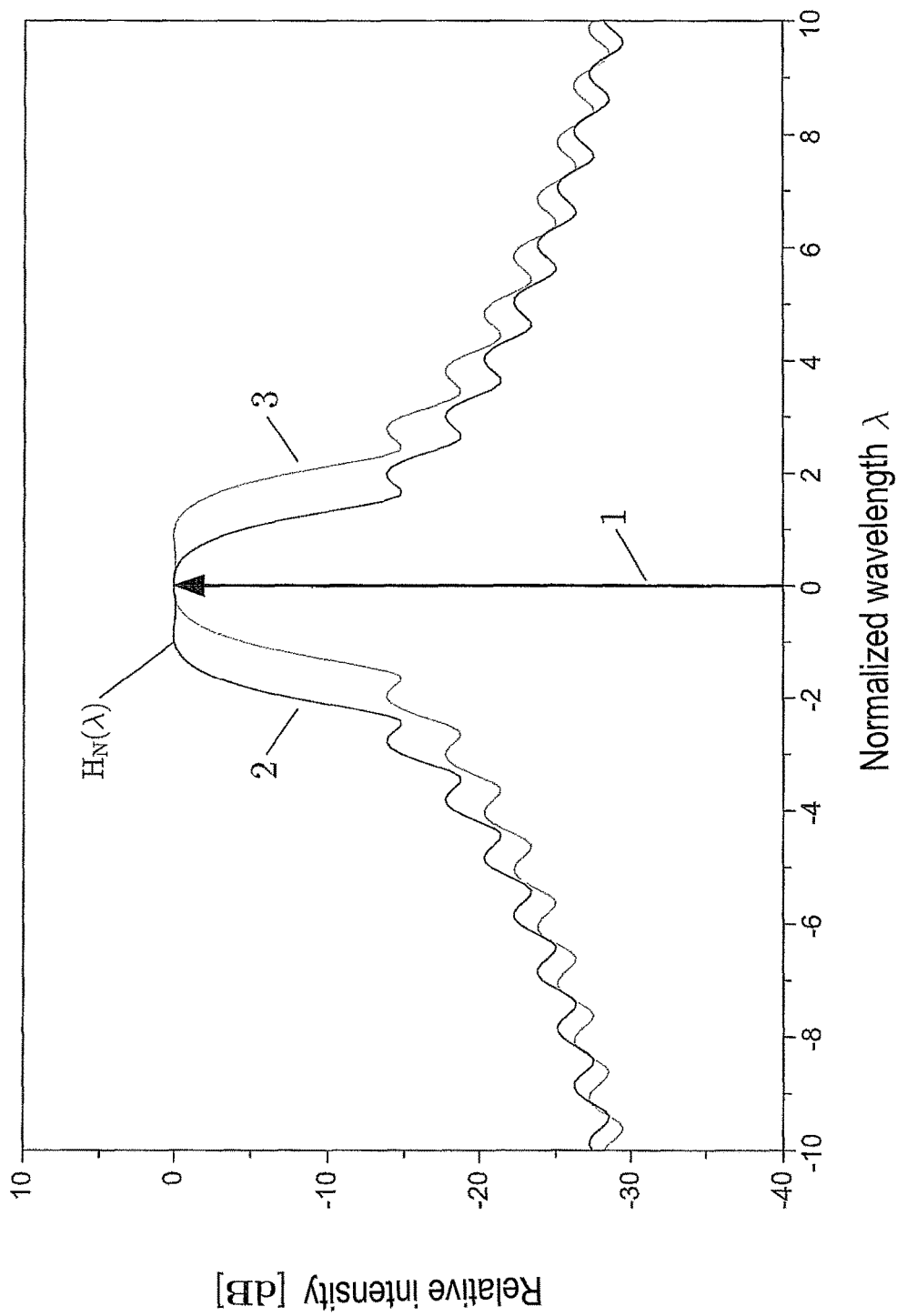
FIG. 3 is similar to FIG. 1 showing the effect of temperature on the transfer function.

The principle of compensating the temperature drift when actuating the acousto-optical element with a radiofrequency signal is elucidated in FIG. 3.

It shows the principle, according to the invention, of compensating the temperature drifts of an AOTF/AOM by actuating the crystal with five carriers with substantially the same power.

The transfer function $H_N(\lambda)$ at room temperature (2) is spectrally shifted (3) by heating of the crystal; the width of the main lobe and the decay behavior of the side lobes thereof are not influenced thereby. A suitable selection of carrier number and spacing causes the main lobe of the transfer function to be spectrally spread by the superposition of a plurality of individual main lobes in such a way that the laser line (1) with a fixed wavelength is transferred without alteration over the entire temperature range.

Figure 4:
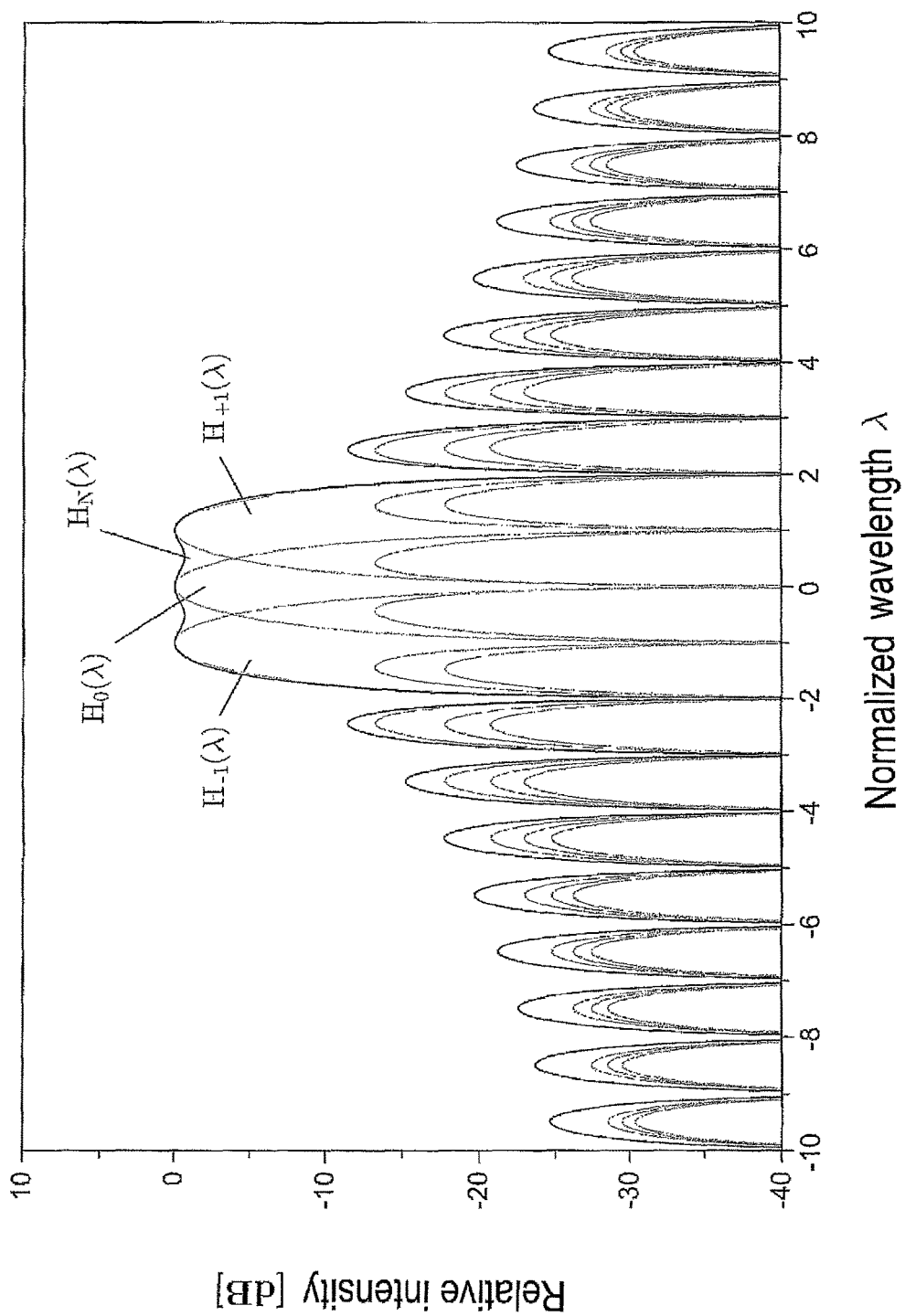

FIGS. 4 and 5 should further elucidate the creation of the summed transfer function when actuating an AOTF with an OFDM (orthogonal frequency-division multiplexing) signal.

An OFDM signal with three carriers is used in both figures—the resultant transfer function $HN(\lambda)$ (therefore emerges from the superposition of three curves, $Ho(\lambda)$, $H+1(\lambda)$ $H-1(\lambda)$ in FIG. 4 and $Ho(\lambda)$ $H+0.7(\lambda)$ $H-0.7(\lambda)$, respectively shifted spectrally by $\lambda$ and 0.7 n $\lambda$ n relation to one another.

The figures differ in the magnitude of the spectral shift. In the drawing of FIG. 4, the shift is selected in such a way that the main lobe of one transfer function respectively falls into a minimum of the adjacent function. In drawing 5, the shift is slightly smaller (0.7 instead of 1).

The radiofrequency signal is preferably generated using an I/Q mixer, which may have both an analog and digital embodiment. The complex baseband signals for actuating the in-phase and quadrature path of the I/Q mixer may advantageously be calculated with the aid of the inverse discrete Fourier transform (IDFT) in the case of equidistant carrier spacings of the signal.

The I/Q mixer moreover has the advantageous property of suppressing the side bands of the set main signal such that an ideal main lobe of a signal may be generated.

For the purposes of adjusting the frequency generator, like the I/Q mixer, use may advantageously be made of a measured distribution of the temperature-dependent frequency drift of the AOTF, wherein, advantageously a monitor diode, for example, is arranged in the beam path, said monitor diode capturing the change in intensity of the signal transfer of the AOTF dependent on the ambient temperature.

For the purposes of generating the signal, the described signal generator may then advantageously be actuated in such a way that the created widened transfer function has substantially the same spectral characteristic for a desired temperature range.

To this end, an optimization method may advantageously also be carried out using the signal generator in order to generate an ideal number and distribution of the spectrally shifted transfer functions depending on the predetermined temperature difference, within which the AOTF has the same transfer characteristic.

The radiofrequency signals for actuating the signal generator, like the I/Q mixer, may advantageously be generated using a freely programmable component such as an FPGA.

In a completely different context, FPGAs have already been described in conjunction with laser scanning microscopes: DE102006034905 A1, DE19858456 A1.

In an unexpectedly simple but nevertheless very variable manner, the invention solves the complicated attempts, described in the aforementioned prior art, of rectifying the problem of the temperature dependence of acousto-optical components.

Advantageously, the invention is also applicable for acousto-optical components in microscopes which manipulate both the illumination beam path and the detection beam path, for example to set the bandwidth of passed or blocked wavelength ranges, for example also in the case of a broadband light source ("white light laser").

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

The invention claimed is:

1. An apparatus for actuating an acousto-optical component for manipulation of laser light passing through the acousto-optical component as illumination light and/or detection light of a microscope in the form of a pulse of a laser system with a spectral width or a laser line with a specific wavelength, comprising:
   a) said acousto-optical component having a transfer function which describes a relationship between the spectral properties of the acousto-optical component and a spectral characteristic of the laser light to be transferred, and
   b) at least one frequency generator for adjusting an illumination wavelength of the illumination light and/or a detection wavelength of the detection light, wherein the frequency generator is connected to the acousto-optical component for control of the manipulation, said frequency generator being configured to generate a signal by which, as a result of superposing a plurality of individual main lobes of transfer functions, a resultant main lobe of a resultant transfer function is spectrally spread in such a way that the pulse, with the spectral width thereof, or the laser line, with a fixed wavelength, is transferred without falsification over a temperature range, wherein the acousto-optical component is actuated by two or more actuation signals in such a way that two or more overlapping and/or superposing main lobes of the transfer function of the acousto-optical component or main maxima are generated.

2. The apparatus as claimed in claim 1, wherein the acousto-optical component is an acousto-optical tunable filter (AOTF) or an acousto-optical modulator (AOM).

3. The apparatus as claimed in claim 1, wherein the frequency generator is an I/Q mixer.

4. The apparatus as claimed in claim 1, wherein provision is made of a field-programmable gate array ("FPGA") for actuating the frequency generator.

5. A microscope containing an apparatus as claimed in claim 1.

6. A method for actuating an acousto-optical component for manipulation of laser light passing through the acousto-optical component as illumination light and/or detection light of a microscope in the form of a pulse of a laser system with a spectral width or a laser line with a specific wavelength, comprising:
   a) adjusting wavelength of said illumination light and/or said detection light by means of at least one frequency generator connected to the acousto-optical component and controlling the manipulation,
   b) generating a signal by means of the frequency generator, which signal, as a result of superposing a plurality of individual main lobes of transfer functions, spectrally spreads a resultant main lobe of a resultant transfer function in such a way that temperature-dependent shifts of the transfer functions do not change the transfer behavior of a crystal of the acousto-optical element and the pulse, with the spectral width thereof, or the laser line, with a fixed wavelength, is transferred without falsification over a temperature range, and
   c) actuating the acousto-optical component by two or more actuation signals in such a way that two or more overlapping and/or superposing main lobes of the transfer functions of the acousto-optical component or main maxima are generated.

7. The method as claimed in claim 6, wherein the main lobes are each delimited by two minima.

8. The method as claimed in claim 6, wherein a main lobe intensity/side lobe intensity ratio is at least 10:1.

9. The method as claimed in claim 6, wherein spectrally shifted transfer frequencies are provided on both sides of the illumination light and/or detection light wavelength.

10. The method as claimed in claim 6, wherein signal distribution of the frequency generator is adjusted on the basis of a measured temperature-drift curve of the acousto-optical component.

11. The method as claimed in claim 6, wherein, in an optimization method, the signal distribution is modified and the arisen distribution is captured and corrected in respect of temperature behavior thereof.

* * * * *

UNITED STATES PATENT AND TRADEMARK OFFICE
CERTIFICATE OF CORRECTION

PATENT NO. : 10,302,490 B2
APPLICATION NO. : 15/320567
DATED : May 28, 2019
INVENTOR(S) : Burkhard Roscher, Stefan Wilhelm and Gunter Moehler It is certified that error appears in the above-identified patent and that said Letters Patent is hereby corrected as shown below:

In the Specification

Column 3, Line 27 now reads:
"the main lobe in the resultant transfer function $H_{93}(\lambda)$ as a"
Should read:
--the main lobe in the resultant transfer function $H_{\Sigma}(\lambda)$ as a--

Column 5, Line 51 now reads:
"respectively shifted spectrally by $\lambda$ and 0.7 n $\lambda$ n relation to"
Should read:
--respectively shifted spectrally by $\lambda$ and 0.7 n $\lambda$ in relation to--

Signed and Sealed this
Ninth Day of July, 2019

Andrei Iancu
*Director of the United States Patent and Trademark Office*